United States Patent [19]
Warner

[11] 3,831,319
[45] Aug. 27, 1974

[54] AWNING-STORM SHUTTER AND SPRING CLIP ATTACHMENT MEANS

[76] Inventor: Frederick Eugene Warner, 990 N.W. 13th Ter., Fort Lauderdale, Fla. 33311

[22] Filed: Apr. 10, 1973

[21] Appl. No.: 349,688

[52] U.S. Cl. ..................... 49/62, 52/203
[51] Int. Cl. .................. E06b 1/34, E06b 3/30
[58] Field of Search ............ 49/62, 61, 57, 71, 50; 52/202, 203

[56] References Cited
UNITED STATES PATENTS

| | | | |
|---|---|---|---|
| 2,631,698 | 3/1953 | Buckwalter | 49/62 |
| 2,694,842 | 11/1954 | Scott et al. | 419/62 |
| 2,877,840 | 3/1959 | Hurowitz et al. | 49/62 X |
| 3,129,793 | 4/1964 | Ferrell | 52/202 X |
| 3,528,196 | 9/1970 | Luke | 49/62 |
| 3,762,119 | 10/1973 | Sowle | 49/62 X |

Primary Examiner—Robert R. Mackey
Assistant Examiner—Philip C. Kannan
Attorney, Agent, or Firm—Birch and Birch

[57] ABSTRACT

An anti-glare translucent weather shield for awning type windows provided with quick attachable clip means. The shield being made of corrugated plastic sheet and when attached by the clip means to the window units serving as an awning when the window is open or as a storm shutter when the window is closed. Also, the shield is molded with glass fibers for reinforcement and tested on each side to support predetermined loads imposed on it during hurricanes and the like when attached to a window as a storm shutter.

11 Claims, 3 Drawing Figures

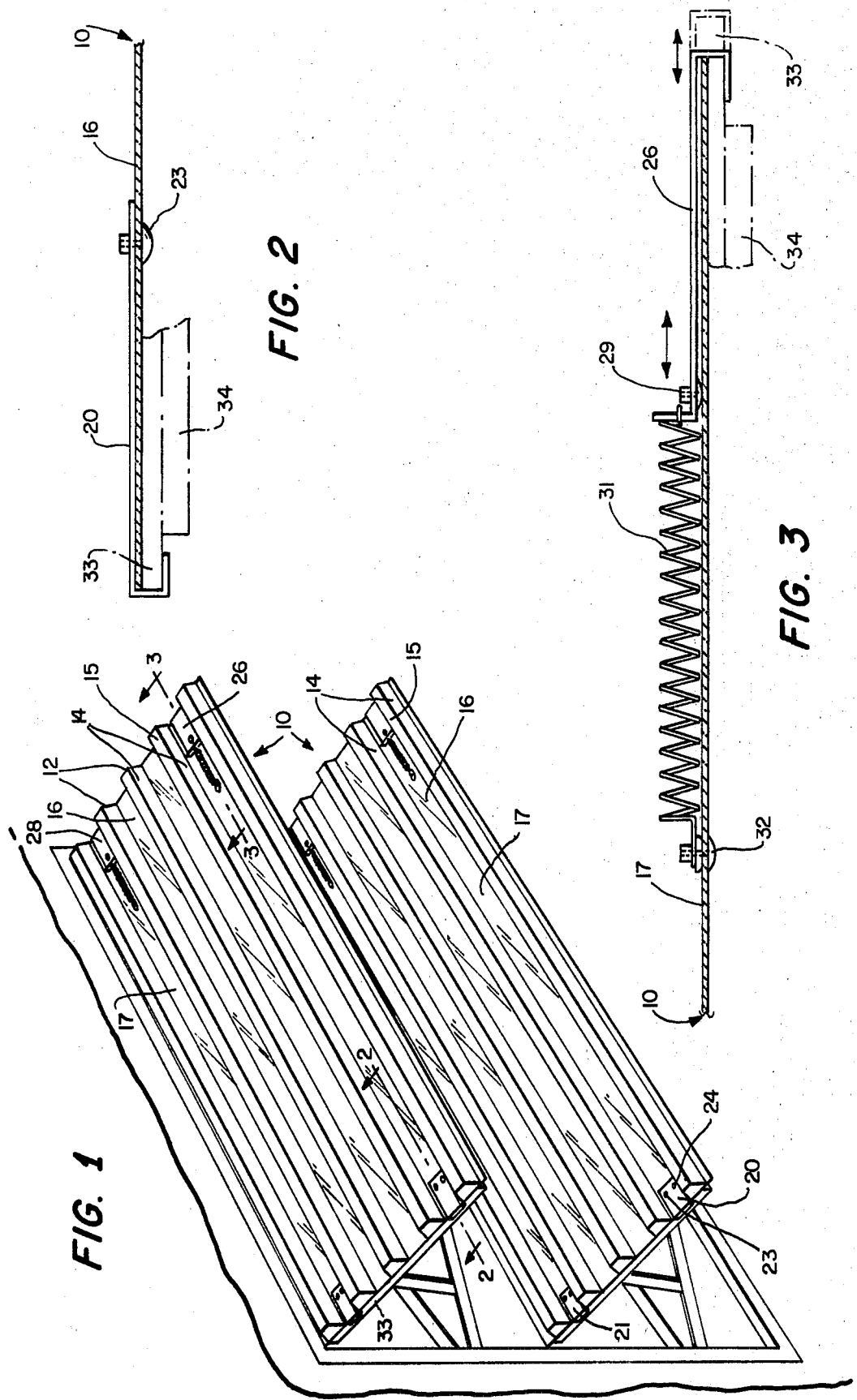

3,831,319

AWNING-STORM SHUTTER AND SPRING CLIP ATTACHMENT MEANS

BACKGROUND OF THE INVENTION

The present invention relates generally to a weather shield preferably molded from fiberglass and equipped with spring clip means so it may be applied with a minimum of effort to a window.

Heretofore, storm shutters for awning or canopy type windows have been provided, but such shutters have been heavy and clumsy in order to be properly resistant to loads imposed by hurricane and the like and are difficult to apply to the window sections by one person alone, because of inefficient fastener arrangements, such as special bolts, screws and the like for attaching the shutters to the windows.

OBJECTS OF INVENTION

An object of the present invention is to provide a strong novel light weight weather shield of molded fiberglass with reinforcing glass fibers having predetermined resistance to loads imposed thereon by storm pressures such as develop during hurricanes and the like.

Another object is to provide a combined sun and weather shield adaptable for use either as an awning or as a storm shutter.

Another object is to provide a corrugated sheet for use as an awning or a storm shutter equipped with spaced attaching clips countersunk between the sheet corrugations and arranged to be snapped onto a window frame over the glass portions of the window with a minimum of muscular effort by an individual without assistance.

Yet another object is to provide novel clip means mounted on weather protective panels for easy snap on application to the window frame of a window to be protected.

Still another object is to provide light weight weather shield panels made with longitudinal corrugations for added structural strength and to provide for nested stacking of the panels for shipment and storage.

SUMMARY OF THE INVENTION

This invention provides an easily applied clip on a corrugated fiberglass storm panel preferably formed from extrusion molded fiberglass with glass fiber reinforcement treated for heat and sun reflection when used as an awning and calibrated to support loads encountered when used as a storm shutter. For example, the combination awning-storm shutter may be plotted and calibrated in accordance with selected building codes, for example to comply with the South Flordia building code and county and zoning department, such for example for pressure inward of 29.6 psf and pressure outward of 22.0 psf for each panel.

The above and other objects and advantages of the present invention will appear more fully hereinafter from a consideration of the detailed description which follows, taken together with the accompanying drawings wherein the invention is illustrated. It is to be understood, however, that the drawings are for the purpose of illustration only and are not intended as a definition of the limits of the invention.

BRIEF DESCRIPTION OF DRAWINGS

In the drawings, wherein like reference characters refer to like parts throughout the several views:

FIG. 1 is a perspective view of an awning type window and frame structure at least partially open with the awning-storm shutter panels applied to the window frame by the present novel clip means;

FIG. 2 is a partial longitudinal section view taken on line 2 — 2 of FIG. 1 of the fixed clip means;

FIG. 3 is a partial longitudinal section view taken on line 3 — 3 of FIG. 1 of the fixed clip means.

DETAIL DESCRIPTION OF THE PREFERRED EMBODIMENT

Referring to the drawings and first with reference to FIG. 1, there is shown a corrugated thin light weight panel 10 attached by novel clip means to the frame of an awning type window. This panel is preferably molded by extrusion from a suitable reservoir of fiberglass and may be reinforced with glass fibers. It is formed with longitudinal corrugations 12 of a predetermined shape throughout its length.

The corrugations 12 are formed with a specific shape formation of frusto-conical ribs 14 which define valleys 16 between the same. For example, the top surfaces 15 of each rib are preferably flat and relatively narrow with respect to the bottom surface 17 of the valleys between pairs of adjacent ribs. Thus the frusto-conical ribs diverge to the bottom surfaces of each respectively adjacent valley, whereby the ribs are in effect elongated flat-topped pyramids, which extend longitudinally of the exterior side of the panel 10, while longitudinally of the interior or window adjacent side of the panel the valleys may be aligned to nest with the flat-topped ribs when an exterior side of one panel and the interior side of a second similar panel are placed together for shipment or storage. Also, during formation of each panel by molding, the exterior and interior sides of each panel are made to resist loads likely to be imposed during use.

After the panels 10 are formed they are fitted with novel clip means at each terminal edge at predetermined locations in some of the valleys between the ribs 14. These clip means at one end of the panel preferably are flat sheet metal hook fasteners 20 and 21 fixedly secured between the ribs 14 by suitable fastener means such as rivets or bolts 23 and 24 to the bottom surface 17 of two or more of the valleys 16. The clip means at the opposite terminal edge of the panel 10 are similar in formation to the fixed sheet metal hooks 20 and 21, but these sheet metal hooks 26 and 28 are movable with respect to the sheet metal fixed hooks and each are tethered at their inboard end by a suitable connecting means, such as a lug or bolt 29 to an elongated spring member, such as a coil spring 31. The opposite end coil of the spring member 31 is placed under tension as shown in FIG. 3, when the hook ends engage over the panel edge and is anchored to suitable means, such as a rivet or bolt 32 at its opposite end to the bottom surface 17 of one of the same respective valleys 16 in which one of the fixed fastener hooks 20 or 21 are secured.

Thus each of the fixed and movable fastener hooks are countersunk between the ribs 14 to a bottom surface 17 of a valley 16 in alignment with each other to provide for quick attachment or release of a panel to the end portion of a frame 33 of a window 34, see FIGS. 2 and 3. The window 34 is preferably an awning type window, as shown in FIG. 1, to provide for use as an awning when the window is open and when used as a storm shutter with the window closed.

The simple clip attachment of the panel 10 to the window frame 33 is accomplished without the usual bolts or screws of the prior art by first engaging the hook end of the fixed hook fasteners 20 and 21 over the frame and then selectively pulling the movable hook fasteners 26 and 28 toward the other end of the window, to thereby extend the clip associated spring 31 as shown in FIG. 3, to provide a biasing force to snap engage over the window frame at this end. When the respective hook fasteners are thus engaged over each frame end of the window, the panels 10 are snugly fitted and attached to cover the window for use as an awning or as a storm shutter.

Thus with the provision of the present invention novel clip means, the awning-storm shutter combination panels may be easily applied without the need to bore bolt or screw holes in the window frame or in anyway deface or damage the existing window structure.

Without further description it is believed that the advantages of the present invention over the prior art is now apparent and while only one prefered embodiment of the invention is illustrated, it is to be expressly understood that the same is not intended to be limited thereto as various changes may be made in the combination and arrangement of the parts illustrated, as will now likely appear to others skilled in the art.

What is claimed:

1. A translucent weather shield for windows formed with longitudinal elongated corrugations to provide ribs and valleys, said shield including quick attachable window frame engageable spaced pairs of clip means at the respective terminal ends of the said shield, one pair of clip means being fixed by suitable means, spring means connected to said other spaced pair of clip means at the opposite end in some of said valleys of the shield, said spring means being secured to said shield from a tethered connection in a corresponding valley with the fixed clip means to thereby clip each terminal end of the shield to said window frame.

2. A translucent weather shield for windows as described in claim 1, wherein the bottom surfaces of the valleys between the ribs of the corrugated translucent sheet are relatively wider than the transverse top surfaces of the ribs and wherein the sides of each of the ribs diverge to the said bottom surfaces to provide for nesting of the said sheets for shipment and storage.

3. A translucent weather shield for windows as described in claim 2, wherein said transverse top surfaces of the ribs are flat and nest on aligned bottom surfaces of said valleys when two or more of said panels are stacked for shipment and storage.

4. A translucent weather shield for windows as in claim 1, wherein said shield is molded from fiberglass sheet and said corrugations are longitudinal of each sheet and are formed to support predetermined inward and outward load pressures likely to be imposed thereon during use and in accordance with predetermined building code specifications.

5. A translucent weather shield for windows as in claim 4, wherein said clip means at each said respective terminal end are secured in spaced relation in at least two of the valleys between adjacent ribs of the corrugated sheet, and wherein said clip means connected to said spring means at one terminal end are relatively movable with respect to the fixed clip means at the opposite terminal end of the sheet.

6. A translucent weather shield for windows as described in claim 5, wherein said spring means is a coil spring tethered at one end to the said movable flat clip means and at the opposite end to the bottom surface of one of said valleys between adjacent ribs, whereby forward pull on said movable clip means elongates and tensions said spring to provide quick snap on connection of the clip means with a window frame to attach said weather shield over the window structure.

7. A translucent weather shield for windows as in claim 4, wherein said shield is treated to be glare resistant and storm resistant, whereby the same may function as an awning or as a storm shutter.

8. A translucent weather shield for windows as in claim 4, wherein said clip means are hook members formed from sheet material, each of said clip means being mounted on the surface of one of said valleys and having a hook spaced and extending toward the window side of the shield, to thereby engage and conform to the outer edge of a suitable window frame.

9. A translucent weather shield for windows as in claim 8, wherein said movable clip means are spring tethered and extensible so as to snap fit onto a window frame to provide quick attachment of the weather shield over a window in the frame.

10. A translucent weather shield for windows as in claim 9, wherein said clip means are confined in the valleys and guided between the adjacent ribs defining a valley, to thereby facilitate attachment operation of the clip means.

11. A translucent weather shield for windows as described in claim 10, wherein the said clip means are secured in their respective valleys of the corrugated sheet in a countersunk position below the level of the said ribs, whereby said weather shields may be stored in nested relation when not installed.

* * * * *